(12) United States Patent
Walt et al.

(10) Patent No.: US 12,317,863 B1
(45) Date of Patent: Jun. 3, 2025

(54) PET TREAT HOLDER AND SAFETY DEVICE

(71) Applicant: BOW WOW LABS, INC., Novato, CA (US)

(72) Inventors: Brian J. Walt, King of Prussia, PA (US); Randy D. Jack, Wisconsin Rapids, WI (US); Alexander Bornemann, Duxbury, VT (US)

(73) Assignee: BOW WOW LABS, INC., Navato, CA (US)

( * ) Notice: Subject to any disclaimer, the term of this patent is extended or adjusted under 35 U.S.C. 154(b) by 0 days.

(21) Appl. No.: 18/817,478

(22) Filed: Aug. 28, 2024

Related U.S. Application Data

(63) Continuation of application No. 16/685,706, filed on Nov. 15, 2019, now abandoned.

(60) Provisional application No. 62/768,781, filed on Nov. 16, 2018.

(51) Int. Cl.
*A01K 15/02* (2006.01)

(52) U.S. Cl.
CPC .................................. *A01K 15/026* (2013.01)

(58) Field of Classification Search
CPC ............................ A01K 15/026; A01K 5/0114
See application file for complete search history.

(56) References Cited

U.S. PATENT DOCUMENTS

| | | | |
|---|---|---|---|
| 5,003,927 A * | 4/1991 | Thompson | A01K 7/06 137/271 |
| 5,595,142 A | 1/1997 | Chill | |
| 7,424,886 B1 | 9/2008 | Tsengas | |
| D624,711 S | 9/2010 | Shatoff et al. | |
| D636,949 S | 4/2011 | Axelrod et al. | |
| 8,087,387 B2 | 1/2012 | Gamble et al. | |
| 9,832,976 B2 | 12/2017 | Dewey et al. | |
| 9,839,199 B2 | 12/2017 | Dewey et al. | |
| D858,911 S | 9/2019 | Becattini, Jr. | |
| 10,524,450 B1 | 1/2020 | Dewey | |
| 10,609,900 B2 * | 4/2020 | Gennusa | A01K 5/0114 |
| 10,701,899 B1 | 7/2020 | Shrestha | |
| 10,701,900 B1 | 7/2020 | Shrestha | |

(Continued)

FOREIGN PATENT DOCUMENTS

| | | | | |
|---|---|---|---|---|
| CA | 3058562 A1 | 4/2020 | | |
| CA | 2965320 C * | 12/2022 | ........... | A01K 15/026 |

(Continued)

OTHER PUBLICATIONS

International Search Report and Written Opinion in International Patent Application No. PCT/US2019/061799, mailed Jan. 29, 2020 (11 pages).

*Primary Examiner* — Ebony E Evans
(74) *Attorney, Agent, or Firm* — NIXON PEABODY LLP; Jeffrey L. Costellia

(57) ABSTRACT

A device for securing a pet toy or treat and related methods are described. The device includes a body including one or more inner walls defining a void. The device further includes one or more non-slip features on the one or more inner walls that are configured to extend into the void. The device further includes a retaining feature movably coupled to the body. The retaining feature is configured to cooperate with the one or more non-slip features to retain at least a portion of an object inserted in the void against the body.

19 Claims, 4 Drawing Sheets

(56) References Cited

U.S. PATENT DOCUMENTS

| | | | |
|---|---|---|---|
| 10,888,069 | B2 | 1/2021 | Becattini, Jr. et al. |
| 10,925,258 | B1* | 2/2021 | Noaeill ................ A01K 5/0114 |
| 11,000,014 | B2 | 5/2021 | Karras |
| 11,116,180 | B2 | 9/2021 | Toolan et al. |
| 2001/0008125 | A1 | 7/2001 | Mann |
| 2009/0217885 | A1 | 9/2009 | Peter et al. |
| 2012/0204809 | A1* | 8/2012 | Axelrod ................ A01K 15/026 |
| | | | 119/709 |
| 2013/0087104 | A1 | 4/2013 | Williams et al. |
| 2013/0247836 | A1 | 9/2013 | Axelrod et al. |
| 2014/0230752 | A1* | 8/2014 | Yerton ................... A23K 50/42 |
| | | | 119/709 |
| 2014/0318472 | A1 | 10/2014 | Day |
| 2017/0020109 | A1 | 1/2017 | Dewey et al. |
| 2017/0223930 | A1 | 8/2017 | Kelsay |
| 2018/0303071 | A1* | 10/2018 | Allen, Jr. .................. B25B 5/06 |
| 2020/0113152 | A1 | 4/2020 | McFarlane et al. |
| 2020/0154676 | A1* | 5/2020 | Walt ...................... A01K 15/026 |
| 2020/0196574 | A1* | 6/2020 | Kendall ................ A01K 15/026 |
| 2021/0212290 | A1* | 7/2021 | Stern ..................... A01K 15/026 |

FOREIGN PATENT DOCUMENTS

| | | | | |
|---|---|---|---|---|
| DE | 202013104991 U1 * | 1/2014 | ........... | A01K 15/025 |
| WO | WO-2021216646 A1 * | 10/2021 | ........... | A01K 15/025 |

* cited by examiner

PET TREAT HOLDER AND SAFETY DEVICE

FIELD

Embodiments of the invention relate generally to a pet-related device. In particular, embodiments of the invention relate to a pet treat holder that secures pet treats.

BACKGROUND

Consumable and non-consumable pet toys or treats provide a variety of benefits for both pets and their handlers. Various types of toys and treats can encourage positive interaction and socialization between a pet and its handler. Chewable pet toys and treats can provide pets with entertainment and relief from stress caused by separation anxiety, loneliness and boredom. Chewable pet toys and treats can also provide enhanced dental prophylaxis and masticatory exercise, and relief from pain associated with teething. Treats such as bully sticks (i.e., bull pizzle), rawhide sticks and other chewable animal food products are popular consumable toys or treats for pets. However, pets often instinctively consume chewable objects, including both durable and consumable objects, in-part or in-whole. This can frequently lead to circumstances that are detrimental to the health of the pet.

SUMMARY

A device for securing a pet toy or treat and related methods are described. The device includes a body including a void defined by an inner wall. The device includes one or more non-slip features. The one or more non-slip features are configured to extend in part into the void. The device includes a retaining feature movably coupled to the body. The retaining feature is configured to work with the one or more non-slip features to affix at least a portion of an object inserted in the void to the body.

According to some aspects of the present disclosure, a device is provided containing a body including one or more inner walls defining a void. The device further includes one or more non-slip features on the one or more inner walls that are configured to extend into the void. The device further includes a retaining feature movably coupled to the body. The retaining feature is configured to cooperate with the one or more non-slip features to retain at least a portion of an object inserted in the void against the body.

According to some aspects, the body includes a first head portion and a second head portion connected on opposite ends of a body portion. The body portion includes the one or more inner walls. The retaining feature is moveably coupled to within the second head portion. The retaining feature is also adjusted relative to the second head portion of the device by changing an amount of the retaining feature that extends through the second head portion of the device and into the void of the body.

According to some aspects, the retaining feature includes one or more retaining structures. According to some aspects, the second head portion defines one or more grooves configured to interface with the one or more retaining structures on the retaining feature. According to some aspects, the one or more retaining structures cooperate with the one or more grooves to urge the retaining feature toward the one or more non-slip features or away from the one or more non-slip features upon rotating the retaining feature relative to the body portion. According to some aspects, the retaining feature also includes a friction device configured to inhibit the retaining feature from moving relative to the body.

According to other aspects of the present disclosure, a method is provided for forming a body including one or more inner walls defining a void. The method further includes forming one or more non-slip features on the one or more inner walls that are configured to extend into the void. The method further includes forming a retaining feature movably coupled to the body. The retaining feature is configured to cooperate with the one or more non-slip features to retain at least a portion of an object inserted in the void against the body.

According to some aspects, the body includes a first head portion and a second head portion connected on opposite ends of a body portion. According to some aspects, the body portion includes the one or more inner walls. According to some aspects, the retaining feature is moveably coupled to within the second head portion. According to some aspects, the retaining feature is also adjusted relative to the second head portion of the device by changing an amount of the retaining feature that extends through the second head portion of the device and into the void of the body.

According to some aspects, the retaining feature includes one or more retaining structures. According to some aspects, the second head portion defines one or more grooves configured to interface with the one or more retaining structures on the retaining feature. According to some aspects, the one or more retaining structures cooperate with the one or more grooves to urge the retaining feature toward the one or more non-slip features or away from the one or more non-slip features upon rotating the retaining feature relative to the body portion. According to some aspects, the retaining feature also includes a friction device configured to inhibit the retaining feature from moving relative to the body.

According to other aspects of the present disclosure, a method includes providing a device, where the device includes a body including an inner wall defining a void and a retaining feature movably coupled to the body. The method further includes placing an object within the void. The method further includes applying the retaining feature against the object to retain the object within the device between the inner wall of the body and the retaining feature. According to some aspects, one or more non-slip features are on the inner wall of the body and extend into the void. Applying the retaining feature against the object retains the object between the retaining feature and the one or more non-slip features.

According to some aspects, the body includes a first head portion and a second head portion connected at opposite ends to a body portion. According to some aspects, the body portion includes the inner wall defining the void. According to some aspects, the method further includes inserting the retaining feature through the second head portion and into the void. According to some aspects, applying the retaining feature includes rotating the retaining feature relative to the body in a first direction to advance the retaining feature to the object, and further rotating the retaining feature relative to the body in the first direction to retain the object between the inner wall of the body and the retaining feature. According to some aspects, rotating the retaining feature relative to the body in a second direction, opposite from the first direction, releases the object from within the device, which allows removal of the released object. According to some aspects, the retaining feature also includes one or more grip features configured to allow a user to rotate the retaining feature with a hand.

Other features and advantages of embodiments of the present invention will be apparent from the accompanying drawings and from the detailed description that follows.

BRIEF DESCRIPTION OF THE DRAWINGS

Embodiments of the present invention are illustrated, by way of example and not limitation, in the figures of the accompanying drawings, in which like references indicate similar elements and in which.

DETAILED DESCRIPTION

A device configured to hold and secure a pet toy or a treat is described herein. According to some embodiments, the device is configured to receive a consumable chew toy that can include, but is not limited to, any chewable animal food product, such as rawhide sticks, bully sticks, or pizzles (treats derived from the penis of a bull or other large animal). The device is configured to hold the pet toy or the treat and to minimize an opportunity for a pet to get hurt.

Thus, the device is configured to prevent choking due to ingestion of chewable pet toys or treats by dogs, which is a common reason for emergency visits to animal hospitals and veterinarian offices. Although a minority of these cases results in death, emergency medical treatment is costly. Bully sticks and rawhide sticks can be particularly problematic due to their appealing taste and satisfying decomposition during extended chewing, with dogs often attempting to consume the entire treat rather than merely chewing on it. Extended chewing of bully sticks and rawhide can produce a soggy, gooey mass that, if swallowed, can lodge in a dog's throat or become impacted in the digestive tract, leading to choking, impaction, and other potentially life-threatening consequences. The more that the dog drinks or the dog's body produces saliva to try to dislodge the bully stick or rawhide, the more the mass swells, further exacerbating the problem. Additionally, dog's frequently attempt to swallow unchewed or partially-chewed ends of a treat that they can no longer effectively grasp with their forepaws, creating an additional or greater risk due to the still-rigid nature and often unmanageable length of the incompletely-chewed end of the treat.

Figure 1:
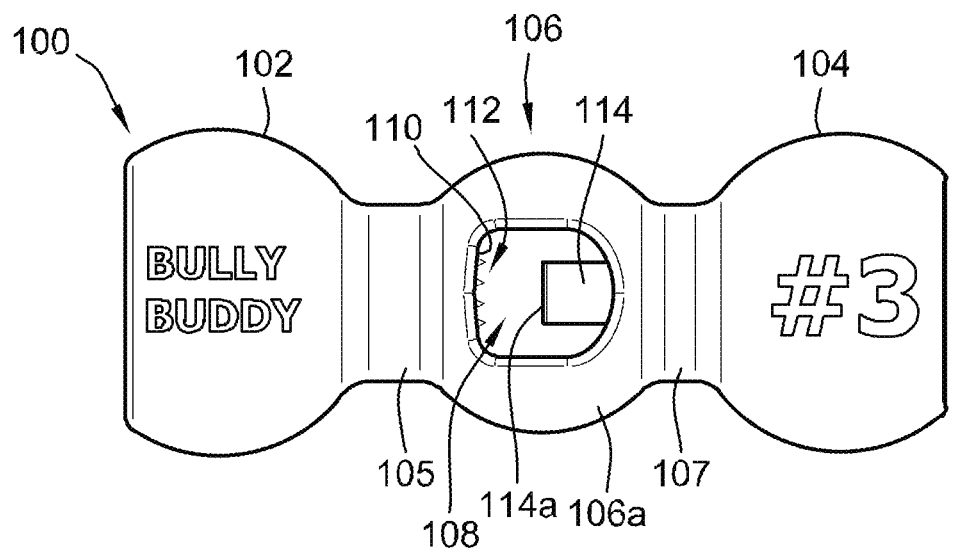
FIG. 1 illustrates a side view of a device, according to an embodiment.

FIG. 1 illustrates a side view of a device 100, according to an embodiment. The device 100 includes a first head portion 102 and a second head portion 104 connected by a body portion 106. For some embodiments, each head portion 102, 104 has a substantially spherical shape. However, the shape of one or both head portions 102, 104 can be a shape other than spherical, such as pyramidal, cubical, etc. The body portion 106 includes a section 106a that is substantially spherical in shape. The section 106a is connected to the first head portion 102 via a first connecting portion 105 and is connected to the second head portion 104 via a second connecting portion 107. The section 106a includes inner walls 110 that define a void 108 such that the body portion 106 is configured to receive a toy or a treat within the void 108. In some embodiments, at least one inner wall 110 of the body portion 106 includes one or more non-slip features 112. The non-slip features 112 are configured to prevent a toy or a treat from slipping free of the device 100. For some embodiments, the one or more non-slip features 112 can include one or more points, knobs, protrusions or other structures that extend into the void 108 from the inner wall 110. For some embodiments, the one or more non-slip features 112 can include one or more indents or recesses that extend into the body portion 106 from the inner wall 110.

The device 100 includes a retaining feature 114 configured to push a toy or a treat against the inner wall 110 and, in some embodiments, the one or more non-slip features 112. More specifically, the retaining features 114 is configured to be movably coupled to the second head portion 104 such that an end 114a of the retaining feature 114 applies a force against a portion of a toy or a treat inserted into the void 108 of the body portion 106. For some embodiments, the retaining feature 114 and the one or more non-slip features 112 are configured to work together to affix at least a portion of the toy or the treat to the device 100. For some embodiments, the retaining feature 114 can be a bolt, a screw, a nail, a pin fastener, a quick-operating fastener, a retaining ring, or any other feature that can be used to push a toy or a treat against the inner wall 110 and the one or more non-slip features 112.

The device 100 is configured to receive the retaining feature 114 in the second head portion 104. The retaining feature 114 is configured to be adjusted relative to the second head portion 104 of the device 100 by changing the amount of the retaining feature 114 that extends through the second head portion 104 of the device 100 and into the void 108 of the body portion 106.

For some embodiments, the first head portion 102 and the second head portion 104 have a substantially spherical shape, with a radius of about 0.5 inch to about 3.0 inches. For some embodiments, the substantially spherical shape has a radius of about 1.25 inches. For some embodiments, the substantially spherical section 106a of the body portion 106 includes a radius in a range including 0.4 inches to 2.75 inches. For some embodiments, the substantially spherical section 106a of the body portion 106 has a radius of 1.063 inches. The first connecting portion 105 of the body portion 106 between the substantially spherical section 106a and the first head portion 102 is configured to have a height less than the first head portion 102 and the substantially spherical section 106a. A second connecting portion 107 of the body portion between the substantially spherical section 106a and the second head portion 104 is configured to have a height less than the second head portion 104 and the substantially spherical section 106a. For some embodiments, the first connecting portion 105 and the second connection portion 107 have the same height. The height of the first connecting portion 105 and second connecting portion 107, according to some embodiments, can be about 0.3 inch to about 5.4 inches. For some embodiments, the height of the of the first connecting portion 105 and second connecting portions 107 is about 1.375 inches.

For some embodiments, the void 108 can have a shape substantially in the form of including, but not limited to, a sphere, a cuboid, a rectangular prism, a polyhedron, a quadrangular prism, a triangular prism, and combinations thereof. For some embodiments, the one or more non-slip features 112 are formed on the inner wall 110, which can be substantially flat or have a greater radius than other walls of the body portion 106. For some embodiments, the inner wall 110 of the body portion 106 defining the void 108 opposite the one or more non-slip features 112 can have a shape similar to the toy or the treat that the device is configured to receive within the void 108. For example, the inner wall 110 of the body portion 106 defining the void 108 opposite the one or more non-slip features 112 can have a radius similar to a portion of a toy or a treat that the device is configured to receive within the void 108. For some embodiments, the body portion 106 can define the void 108 with a maximum height of about 0.7 inch to 5.1 inches. For some embodiments, the body portion 106 can define the void 108 with an asymmetric shape. For other embodiments, the body portion 106 can define the void 108 with a symmetric shape.

Figure 2:
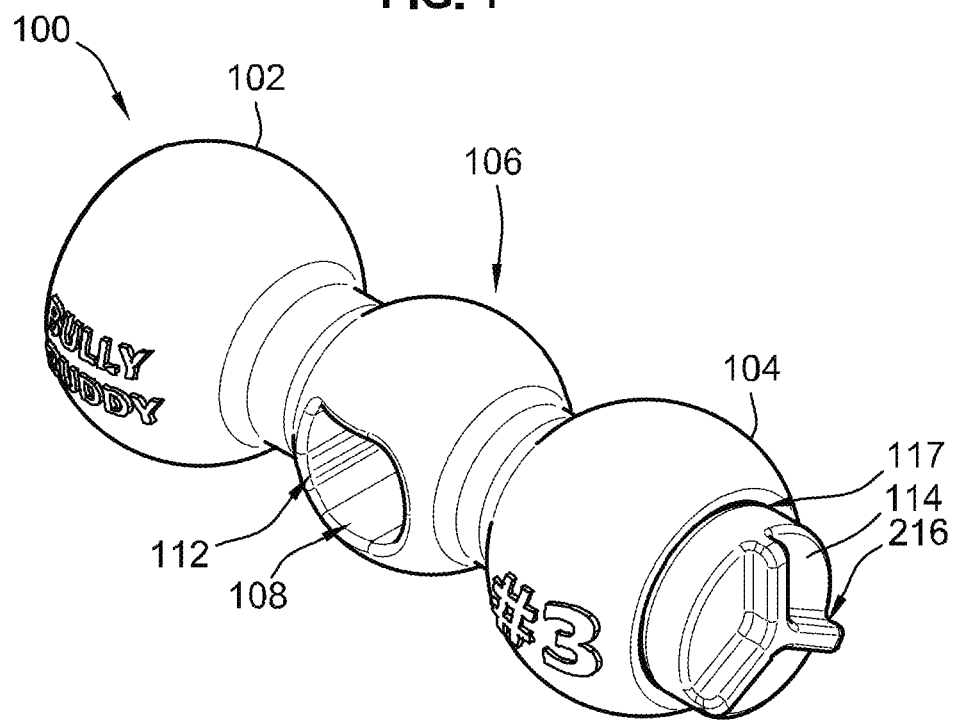
FIG. 2 illustrates a perspective view of the device of FIG. 1, according to an embodiment.

FIG. 2 illustrates a perspective view of the device 100 of FIG. 1, according to an embodiment. The retaining feature 114 is configured to mate with the second head portion 104 in a movable configuration. In other words, the retaining feature 114 is configured to move in relationship to the second head portion 104. For some embodiments, the retaining feature 114 is configured to have one or more grip features 216. The one or more grip features 216 are configured to move the retaining feature 114 in toward the one or more non-slip features 112 or away from the one or more non-slip features 112. For some embodiments, the one or more grip features 216 are configured as one or more protrusions, wings, paddle, knobs, ribs, and the like that enable the retaining feature 114 to be moved with the fingers of a hand. For other embodiments, the one or more grip features 216 are configured to move a retaining feature 114 using a tool, including, but not limited to, a screw driver, a ratchet, or another device. For some embodiments, the second head portion 104 defines a second void 117 that is configured to receive the retaining feature 114 and permit the retaining feature 114 to extend into the void 108.

Figure 3:
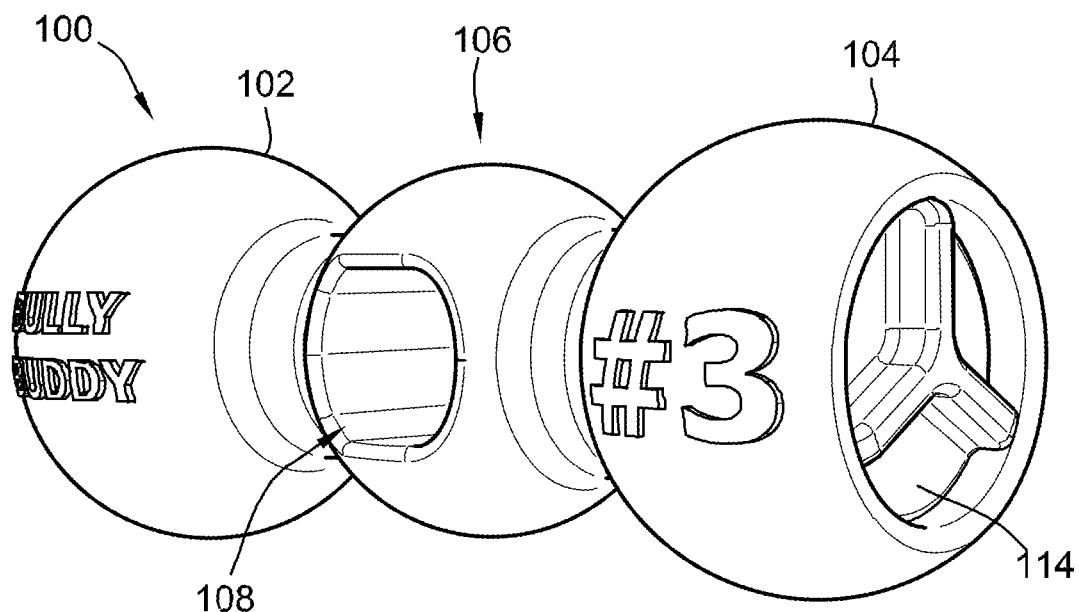
FIG. 3 illustrates another perspective view of the device of FIG. 1, according to an embodiment.

FIG. 3 illustrates another perspective view of the device 100 of FIG. 1, according to an embodiment. As shown in FIG. 3, in some embodiments, the retaining feature 114 can be configured to reside mostly or entirely within the second head portion 104 when it is moved to be adjacent to and apply a force against a toy or a treat.

Figure 4:
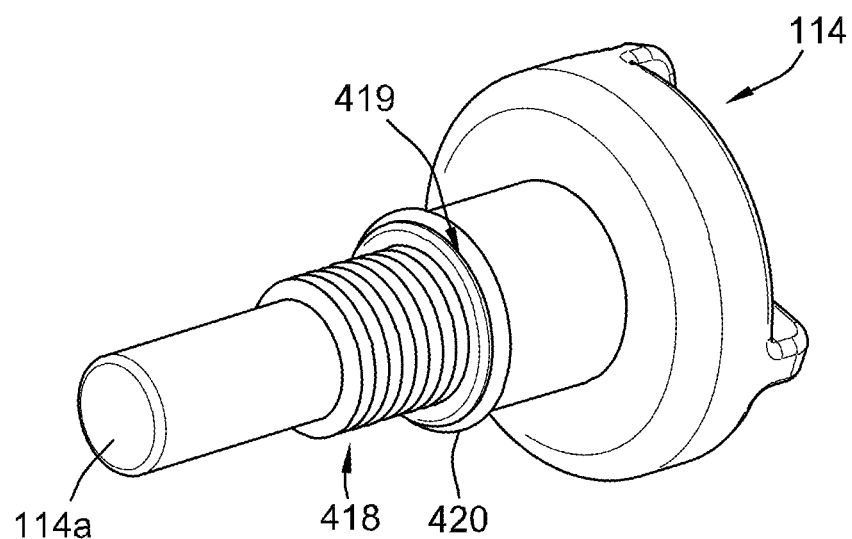
FIG. 4 illustrates a perspective view of a retaining feature of the device of FIG. 1, according to an embodiment.

FIG. 4 illustrates a perspective view of a retaining feature of the device 100 of FIG. 1, according to an embodiment. For some embodiments, the retaining feature 114 includes one or more retaining structures 418, such as one or more threads. The retaining structures 418 are configured to retain the position of the retaining feature 114 and provide a mechanism to urge the retaining feature 114 away from the inner wall 110 and non-slip features 112 (FIG. 1) or towards the inner wall 110 and non-slip features 112. For some embodiments, the retaining structures 418 are configured to mate with corresponding structures within the second head portion 104 of the device 100, as further discussed below with respect to FIG. 6. In such a way, the retaining structure 418 of the retaining feature 114 are configured to maintain a force against a toy or a treat such that the toy or the treat is in contact with the one or more non-slip features 112. This assists in keeping the toy or the treat fastened to the device 100. Moreover, the retaining feature 114 is configured to inhibit movement once it is put in a position.

For some embodiments, the retaining feature 114 can include a friction device 420. The friction device 420 is configured to apply a force between the second head portion 104 (FIG. 1) and the retaining feature 114 to inhibit the retaining feature 114 from moving after it is positioned by hand or using a tool. For some embodiments, the friction device 420 can be an O-ring, a seal, packing, a gasket, or another device configured to assist the retaining feature 114 in maintaining its position relative to the second head portion 104. For some embodiments, the retaining feature 114 can include a feature 419 that is configured to receive the friction device 420. For example, the retaining feature 114 can include a slot within which the friction device 420 partially fits.

Figure 5:
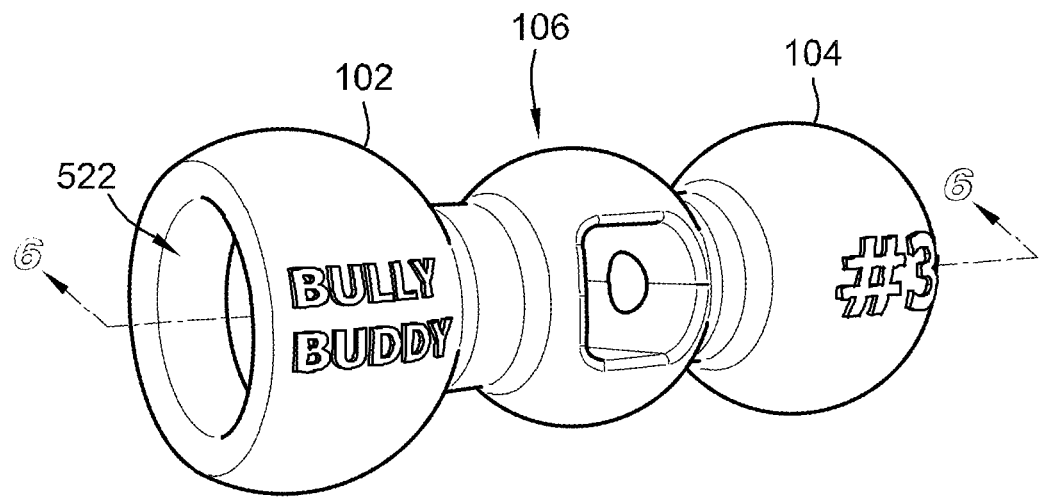
FIG. 5 illustrates a perspective view of the device of FIG. 1 with the retaining feature removed, according to an embodiment.

FIG. 5 illustrates a perspective view of the device 100 of FIG. 1 with the retaining feature 114 removed, according to an embodiment. For some embodiments, the first head portion 102 can define a third void 522. For some embodiments, the third void 522 can have a shape substantially in the form of including, but not limited to, a sphere, a cuboid, a rectangular prism, a polyhedron, a quadrangular prism, a triangular prism, and combinations thereof. The third void 522 can have a shape that is generally the same as the shape of the first head portion 102, or a shape that is different than the shape of the first head portion 102.

Figure 6:
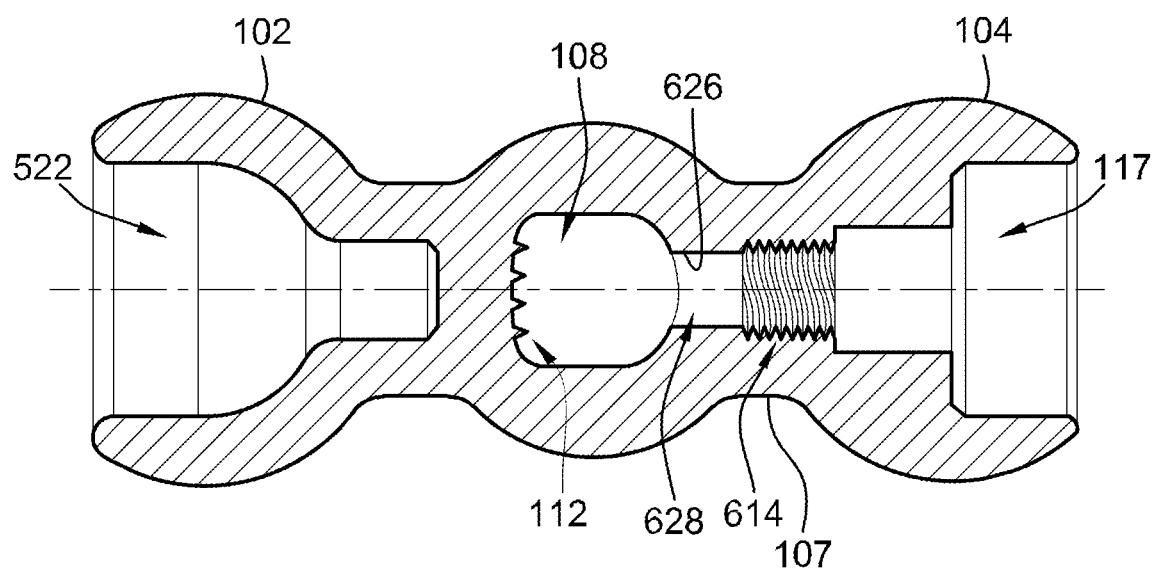
FIG. 6 illustrates a cross-section of the device of FIG. 1 along the line 6-6 in FIG. 5, according to an embodiment.

FIG. 6 illustrates a cross-section of the device 100 of FIG. 1 along the line 6-6 in FIG. 5, according to an embodiment. As discussed above, illustrated are the first head portion 502 defining the third void 522 and the second head portion 104 defining the second void 117. As discussed above, for some embodiments, the second connecting portion 107 can define a through hole 628 through which the retaining feature 114 (FIG. 1) can extend from the second void 117 to the void 108. An inner surface 626 of the through hole 628 of the second connecting portion 107 can include one or more retaining grooves 614. The one or more retaining grooves 614 are configured to cooperate with the retaining structures 418 (FIG. 4) of the retaining feature 114 to urge the retaining feature 114 against a toy or a treat and against the inner wall 110 and the one or more non-slip features 112.

Figure 7:
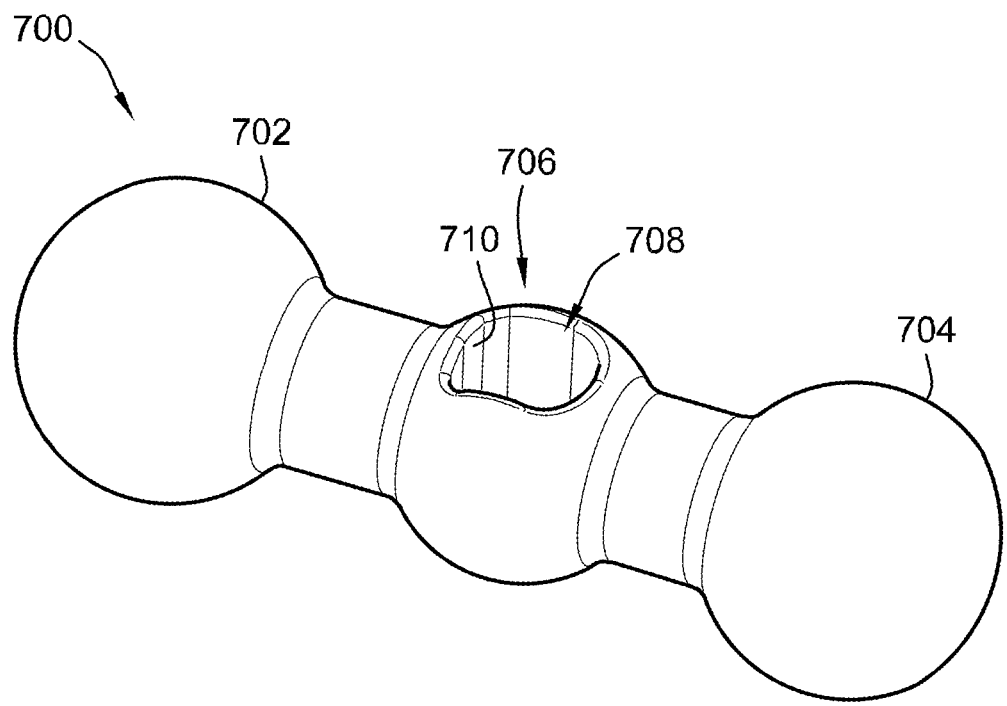
FIG. 7 illustrates a perspective view of a device, according to another embodiment.

FIG. 7 illustrates a perspective view of a device 700 according to an embodiment. The device 700 is similar to the device 100 (FIG. 1) and includes a first head portion 702 and a second head portion 704 connected at opposite ends of a body portion 706. The body portion 706 includes an inner wall 710 that defines a void 708 such that the body portion 706 is configured to receive a toy or a treat within the void 708. However, the device 700 differs from the device 100 based, at least in part, on the second head portion 704 being configured to be removably coupled with the body portion 706. The device 700 further differs as described below with respect to FIG. 8. For some embodiments, the second head portion 704 includes the one or more one or more grip features 816. The one or more grip features 816 are configured to move the second head portion 704 in toward the one or more non-slip features 812 or away from the one or more non-slip features 812.

Figure 8:
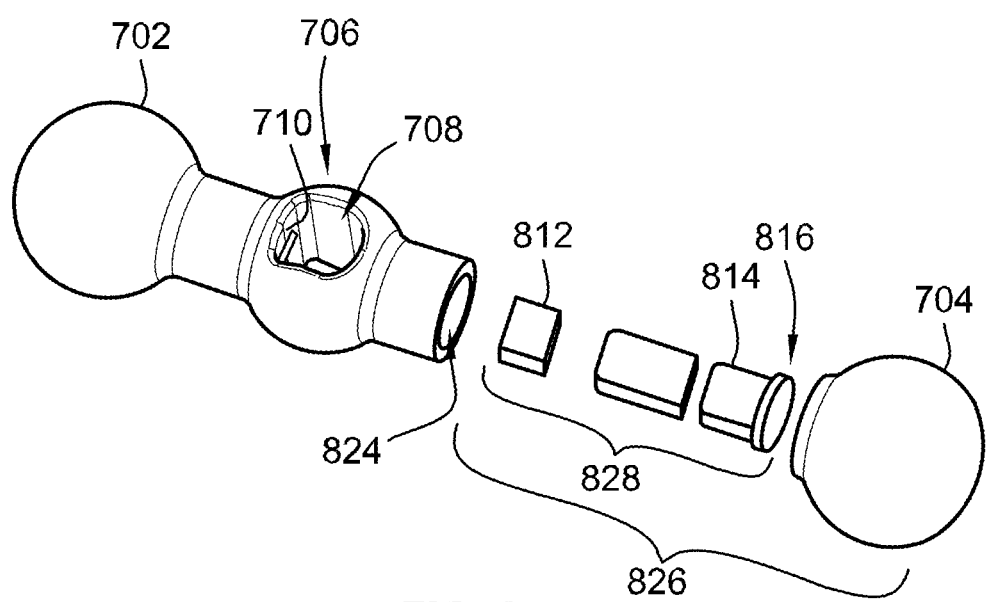
FIG. 8 illustrates an exploded view of the device of FIG. 7, according to an embodiment.

FIG. 8 illustrates an exploded view of the device 700 of FIG. 7 according to an embodiment. The device 700 includes a removable portion 826 including the one or more non-slip features 812. The removable portion 826 is configured to mate with a portion 824 within the body portion 706 of the device 700 such that the non-slip features 812 extend at least partially within the void 708 of the body. For some embodiments, the retaining feature 814 is one or more pieces 828 configured to be in contact with the second head portion 704 directly or indirectly and move toward the inner wall 710 of the body portion 706 within the void 708 or away from the inner wall 710 of the body portion 706 within the void 708 as the second head portion 704 is moved.

For some embodiments, the retaining feature 814 is configured to move when the second head portion 704 is moved in relation to the body portion 706 of the device, which adjusts the amount of the retaining feature 814 that extends through the second head portion 704 of the device 700 and into the void 708 of the body. The device 700 is configured such that an end of the retaining feature 814 applies a force against a portion of a toy or a treat inserted into the void 708 of the body portion 706 into the one or more non-slip features 812. For some embodiments, the one or more non-slip features 812 have a shape such that a point is positioned to come in contact with portion of a toy or a treat placed within the void 708, wherein the shape includes a circle, a square, a rectangle, a polygon, a quadrilateral, a triangle, and combinations thereof. For some embodiments, the non-slip features 812 are a pattern of voids formed in an inner wall 710 of the body portion 706. For other embodiments, the non-slip features 812 are protrusions that extend from the inner wall 710 and into the void 708.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A device for securing a pet toy or a pet treat, the device comprising:
   a body including one or more inner walls defining a first void, the first void being configured to receive the pet toy or the pet treat, the one or more inner walls including a first inner wall; and
   a retaining feature being configured to movably couple to the body such that a first end of the retaining feature extends into the first void and contacts the pet toy or the pet treat to apply a force against a portion of the pet toy or the pet treat when the pet toy or the pet treat is inserted into the first void and when the pet toy or the pet treat is retained against the first inner wall by the retaining feature, the retaining feature including:
   a shaft having:
      a first shaft section ending in the first end of the retaining feature, and
      a second shaft section connected to the first shaft section and having a diameter larger than the first shaft section, and
   an end larger in diameter than the second shaft section and connected to the second shaft section opposite from the first shaft section.

2. The device of claim 1, further comprising a friction device configured to apply a force between the body and the retaining feature to inhibit the retaining feature from moving after it is positioned within the body.

3. The device of claim 2, wherein the friction device fits between the body and the retaining feature at a step from the first shaft section to the second shaft section.

4. The device of claim 2, wherein the retaining feature includes a slot within which the friction device partially fits.

5. The device of claim 1, wherein a second end of the retaining feature resides entirely within the body with the first end of the retaining feature against the portion of the pet toy or the pet treat.

6. The device of claim 1, wherein the body defines a second void and a through hole that connects the second void to the first void, wherein the retaining feature extends into the first void through the through hole and the second void.

7. The device of claim 6, wherein:
   a surface of the body defining the through hole includes one or more retaining grooves,
   the retaining feature includes one or more retaining structures, and
   the one or more retaining grooves are configured to cooperate with the one or more retaining structures to urge the retaining feature against the portion of the pet toy or the pet treat.

8. The device of claim 7, wherein at least a portion of the first shaft section includes the one or more retaining structures.

9. The device of claim 6, wherein the body includes:
   a body portion that defines the first void,
   a first connecting portion and a second connecting portion on opposite sides of the body portion, and
   a first head portion and a second head portion each connected to a respective one of the first connecting portion and the second connecting portion.

10. The device of claim 9, wherein the second connecting portion defines the through hole and the second head portion defines the second void.

11. The device of claim 10, wherein first head portion defines a third void.

12. The device of claim 11, wherein the third void is closed off from the first void.

13. The device of claim 10, wherein the first head portion and the second head portion have a spherical shape with a radius of about 0.5 inch to about 3.0 inches.

14. The device of claim 13, wherein the body portion has a spherical shape with a radius of about 0.4 inches to 2.75 inches.

15. The device of claim 1, wherein the first void has a shape of a sphere, a cuboid, a rectangular prism, a polyhedron, a quadrangular prism, a triangular prism, or a combination thereof.

16. The device of claim 1, wherein the retaining feature includes one or more grip features on the end, opposite the second shaft section, that enable the retaining feature to be rotated with fingers of a hand of a user of the device.

17. A device for securing a pet toy or a pet treat, the device comprising:
   a body including one or more inner walls defining a void, the void being configured to receive the pet toy or the pet treat, the one or more inner walls including a first inner wall; and
   a removable portion being configured to movably couple to the body such that a piece of the removable portion extends into the void and applies a force against a portion of the pet toy or the pet treat inserted into the void and retained against the first inner wall,
   wherein the device has symmetric opposite ends when the body and the removable portion are coupled together, and the body includes a first head portion and a body portion, and the removable portion is configured to movably couple to the body portion opposite from the first head portion.

18. The device of claim 17, wherein the removable portion includes a second head portion similar in shape to the first head portion so that the device has the symmetric opposite ends when the body and the removable portion are coupled together.

19. A device for securing a pet toy or a pet treat, the device comprising:

a body, the body including one or more inner walls, the one or more inner walls including a first inner wall, the one or more inner walls defining a void, the one or more inner walls further defining an aperture configured to provide access for the pet toy or the pet treat into the void; and a retaining feature being movably coupled to the body, the retaining feature including a first end, the first end extending into the void, the first end being in contact with and applying a force against a portion of the pet toy or the pet treat when the pet toy or the pet treat is inserted into the void and when the pet toy or the pet treat is retained between and against the first inner wall and the first end, the retaining feature including a shaft, the shaft including a first shaft section and a second shaft section, the first shaft section ending in the first end, the second shaft section being contiguous to the first shaft section, the second shaft section having a diameter larger than the first shaft section, the retaining feature further including an end, the end having a diameter larger than the second shaft section, the end being contiguous to the second shaft section opposite from the first shaft end.

* * * * *